July 19, 1966    P. CORBIN    3,261,621
AUTOMOBILE SUSPENSION

Filed Aug. 24, 1964    2 Sheets-Sheet 1

INVENTOR
Paul CORBIN
BY

ATTORNEYS

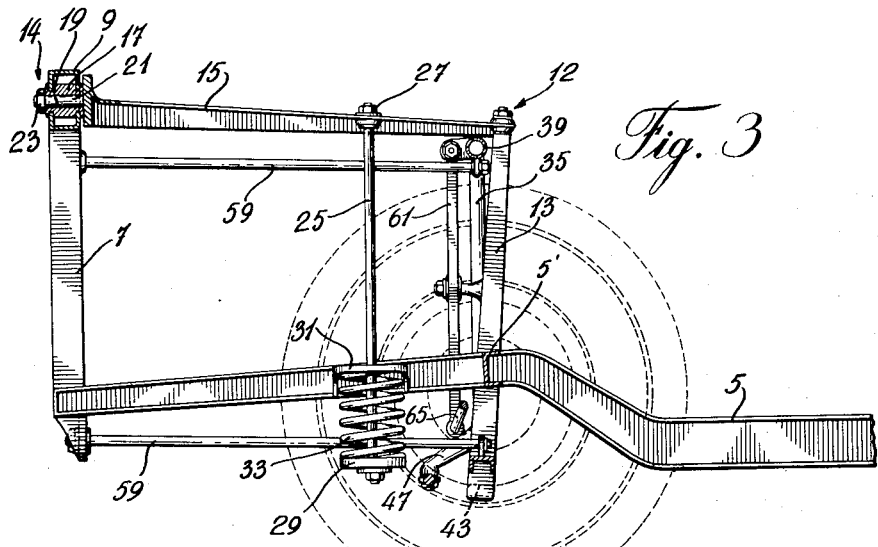

United States Patent Office 3,261,621
Patented July 19, 1966

3,261,621
AUTOMOBILE SUSPENSION
Paul Corbin, 7737 St. Denis St., Montreal,
Quebec, Canada
Filed Aug. 24, 1964, Ser. No. 391,451
8 Claims. (Cl. 280—96.2)

The instant invention relates to an automobile suspension and is an improvement of the invention disclosed in my prior U.S. application No. 284,908, filed on June 3, 1963, now Patent No. 3,150,882.

In the invention of the above-named application, the suspension for the front wheels was adapted to cause banking or tilting of the wheels toward the inside of the curve when the said wheels were steered.

Although the structure disclosed in the said prior application did indeed cause banking of the wheels in a curve, the banking or inclination thereof was only proportional to the extent of steering of the wheels. This meant that in a curve having a wide radius, the banking was relatively small, and of course, in a sharp curve, the banking was appreciably more pronounced. Therefore, the inclination of the wheels had no relation with the speed of the vehicle but was caused only by the actual steering which, of course, was only related to the sharpness of the curve. On the other hand, sharp steering, as when coming out of a parking space, caused the wheels to incline appreciably although the care had hardly any speed and therefore the said banking was unnecessary.

It is therefore a main object of the invention to provide a front wheel suspension whereby the automobile body, as it banks in a curve, reacts on the wheel suspension to cause tilting of the wheels an amount proportional to the banking of the vehicle, that is, proportional to the centrifugal force developed. Therefore, the greater the speed in a curve, the greater the inclination of the front wheels thus substantially increasing the stability of the vehicle. Another point of interest in the instant invention lies in that the front wheels are made to tilt or become inclined by a leverage connection between the body frame and the front wheel suspension independently of any tilting of the wheels caused by steering action. This is of considerable advantage since at high speed, in a curve having a larger radius of curvature as aforesaid, the front wheels are only turned a small degree which would normally correspond to a small tilting thereof. However, the above-mentioned leverage connection increases the inclination of the front wheels an amount which is proportional to the actual speed of the car and independently of the angle of steering.

The above advantages may be obtained with a wheels suspension for motor vehicles comprising: a front wheel suspension frame; a body frame for a vehicle body; said body frame pivotally mounted on the suspension frame above the center of gravity of the body for rocking of the said body about a central axis thereof; a pair of steering knuckle bars, one on each side of said front wheel suspension frame; a wheel mounted on each kuckle bar intermediate the ends thereof for steering movement; a transverse reciprocating balancing rod; each knuckle bar having one end pivotally mounted on said suspension frame and the other end articulated to said balancing rod whereby reciprocation of the said rod causes banking of the knuckle bars and wheels, and leverage balancing means connecting the body frame to the reciprocating balancing rod adapted, upon banking of the said vehicle in a curve and switching of the said body away from the center of the curve, to transmit reciprocating motion to said balancing rod to cause banking of the knuckle bars and wheels toward the center of the curve.

Preferably, the leverage balancing means comprises an operating lever pivotally mounted, intermediate the ends thereof, to the suspension frame, a pair of joining elements, one of said elements pivoted, at the ends thereof, to one end of said lever and to said body frame, and the other joining element pivotally mounted at the ends thereof to the other end of the lever and to the said reciprocating balancing rod.

In a still preferred form of the invention, the suspension frame is formed of a horizontal lower member and two lateral vertical members; the body frame extends through the suspension frame between the two lateral members and above the lower member; the body frame includes an upright structure forwardly of the suspension frame; a pair of connection elements is provided with each of the elements articulated at one end to a common point at the upper end of the upright structure and articulated, at the other end, to the upper end of one of said lateral members whereby said body frame may rock about a horizontal longitudinal axis thereof, and the provision of suspension spring means between each of said connecting elements and said body frame.

It is also within the scope of the invention to provide a rear wheel suspension comprising: a U-shaped bridging frame secured to the rear axle of the vehicle, longitudinally thereof, and over the body frame; suspension spring means interconnecting said body frame and said bridging frame, and stabilizing means interconnecting said body frame and said rear axle on one side of said axle and said body frame and bridging frame on the other of said axle.

A better understanding of the invention will be afforded by the following description of a specific non-limitative embodiment of the invention having reference to the appended drawing wherein:

FIGURE 3 is a longitudinal vertical cross-sectional view of the front wheel suspension;

FIGURE 4 is a perspective view of the rear wheel suspension;

FIGURE 5 is a longitudinal vertical cross-sectional view of the rear wheel suspension of FIGURE 4.

As mentioned previously, the intent of the invention is to provide inclination of the front wheels 1 an amount proportional to the actual banking of car 3 as expressed by the angle $\alpha$ of the swinging motion of the car when the latter takes a curve. The inclination of wheels 1 are, as will be seen hereinafter, independent of the actual amount of steering applied to wheels 1.

Figure 1:
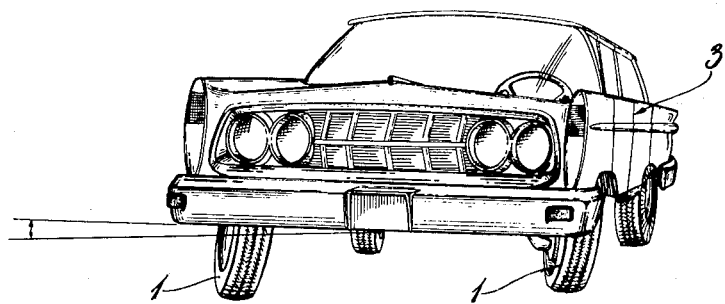
FIGURE 1 is a general perspective view of a motor vehicle provided with the suspension of the invention.
Figure 2:
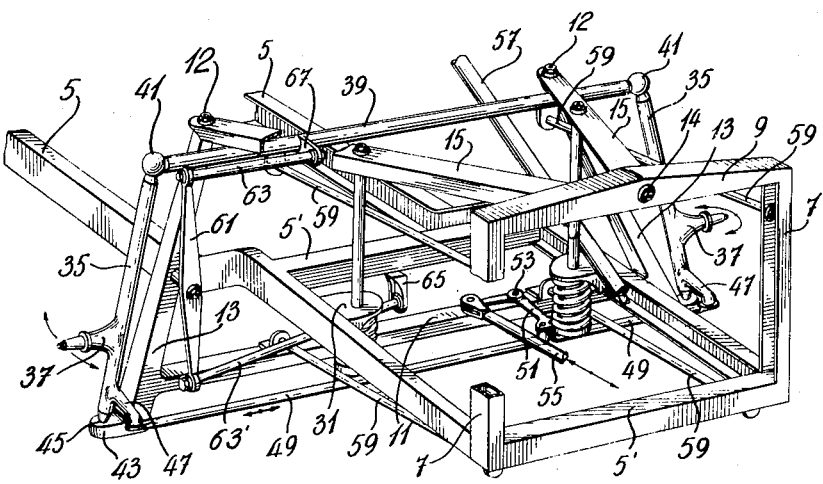
FIGURE 2 is a perspective view of the front wheel suspension according to the invention.

In the front wheel suspension shown in FIGURE 2, the body frame is represented here by two lateral members 5 interconnected, at the front thereof, by two transverse members 5' and including an upright frontal structure formed of a pair of spaced parallel upright stiles 7 and a cross-member 9.

The front wheel suspension frame is formed of a horizontal lower member 11 at the ends of which are two lateral vertical members 13, slightly inclined inwardly toward one another, as shown. It will be noted that the body frame, represented by members 5, 5', 7 and 9, extends through the suspension frame, between the lateral members 13 and above the lower member 11. A pair of connecting elements 15 are connected at one end thereof to the top of the vertical members 13 and, at the other end, to the center of the cross members 9. The connections 12, and 14 of elements 15 to members 13 and member 9 is through what will hereinafter be referred to as an articulated joint. Such joint as 14 is shown in details between members 9 and 15 in the leftward part of FIGURE 3 and will be seen to consist of a rubber insert 17 fixedly secured on member 9 and extending therethrough, the said insert having an axial bore 19 through which extends a pin 21 projecting from the corresponding end of member 15. The said pin 21 is threaded at the free end thereof for the reception of a nut 23 adapted to tighten member 15 against the rubber insert 17. The mounting is such that limited universal movement of elements 15 in relation to member 9 is possible, that is movement in a plurality of planes. In the example shown, the flanges of the rectangular cross member 9 are received in circumferential grooves provided on the outer surface of rubber insert 17, with end portions of the said insert insulating nut 23 and element 15 from the lateral faces of cross member 9.

Other joints of a similar nature, hereinafter to be referred to as articulated joints, may be provided.

Sudden jolts applied on the steering wheels 1, during driving, are transmitted from the suspension frame 11 to the body frame 5 through a pair of suspension spring means formed of a connecting rod 25 secured, at one end, to connecting element 15 through an articulated joint 27 and fixed, at the other end, to a lower plate 29 after having extended through an upper plate 31 fast with the adjacent lateral member 5 of the body frame. A helical spring 33 has the two end spires thereof secured to plates 29 and 31 respectively.

The front wheels suspension is completed by a pair of upright knuckle bars 35, slightly inclined toward one another in the same direction as vertical members 13 of the suspension frame 11.

Each knuckle bar has a stub axle 37, intermediate the ends thereof, for the reception of the steering wheel 1, in known manner. It will be noted that the axes of the stub shafts are horizontal and therefore stand at an angle more than 90° to the vertical knuckle bars.

The two knuckle bars 35 are interconnected, at the upper ends thereof, by a reciprocating balancing rod 39 through articulated joints 41.

The other ends of the knuckle bars 35 are pivotally mounted, as at 45, on extensions 43 projecting laterally outwardly from the lower end of vertical members 13 of the suspension frame.

A steering link 47 projects laterally from each knuckle bar 35 at 90° from the axis of stub axle 37 intermediate the said stub axle and the pivot joint 45. Steering rods 49 connect links 47 to the end of one branch of an L-shaped rocker 51 mounted for rotation, as at 53 and at the center thereof, to the lower member 11 of the suspension frame. The free end of the other branch of rocker 51 is pivotally connected to an operating member 55 which, in turn, is connected to a steering column 57 through a known connection (not shown.)

Longitudinal stability of one frame in relation to the other is obtained by means of two pairs of locating bars 59, the bars of a lower pair interconnecting the front end of the body frame to the lower member 11 while the bars of an upper pair interconnect the stiles 7 of the frontal structures and the reciprocating balancing rod 39.

Finally, a leverage balancing means is provided for connecting the body frame to the suspension frame, said means comprising an operating lever 61 pivotally mounted, intermediate the ends thereof, to one vertical member 13 of the suspension frame and a pair of joining elements 63, 63'. Joining element 63' is articulated at one end to the lower end of operating lever 61 and articulated at the other end to a bracket 65 secured to one transverse member 5' of the aforesaid body frame. The other joining element 63 is articulated at the upper end of operating lever 61 and at the other end to a bracket 67 secured to the balancing rod 39.

The suspension, as above described, operates as follows: when the car takes on a curve and the driver steers the wheels 1, this action rotates the wheels and because of the pivoting connection 14 of the suspension frame to the frontal structure, represented by stiles 7 and cross member 9, the body banks away from the center of the curve as it is assumed that the connection between the two frames is above the center of gravity of the car. As the body frame banks, the lower joining element 63' reacts on the operating lever 61 to reciprocate the upper joining element 63 and consequently the balancing rod 39 to which it is secured. Reciprocation of balancing rod 39, in turn, causes inclination of the knuckle bars and consequently of wheels 1.

As aforesaid, any jolts on one of the wheels 1 caused by a sharp depression or boss on the road is absorbed in the suspension spring means interconnecting the connecting elements 15 and the lateral members 5 of the body frame.

As aforesaid, the invention also provides for a novel rear wheel suspension illustrated in FIGURES 4 and 5. It will be seen that this suspension comprises a U-shaped bridging member 69 having the ends of the lateral legs thereof secured to the rear axle 71 of the car, longitudinally thereof and over the body frame identified by the lateral members 5. The said lateral members 5 ride over the rear axle 71 to define rearward portions 5" interconnected by a transverse bar 6.

The rear wheels suspension also comprises a pair of suspension spring means 73 interconnecting the body frame and the bridging frame 69 and stabilizing means 75 interconnecting the body frame and the bridging frame on the rearward side of axle 71.

As shown, each suspension spring means comprising an operating rod 77 having one end articulated to the transverse bar of the U-shaped frame 69 and the lower end to the end spire of a coil spring 79, the other end spire abutting a box-like member 81 secured to frame 5 through a supporting bracket 83, operating rod 77 extending freely through the other end of box-like member 81.

The stabilizing means shown is in the form of a stirrup 85 articulated at the apex thereof, to the center of the upper transverse bar of the U-shaped bridging frame 69 through an articulated joint 87 while the free ends of the two branches of the stirrup 85 are articulated to upright brackets 89 secured to the above mentioned rear part 5" of frame 5.

A pair of elongated locating rods 91 interconnects the body frame to the rear axle 71 to limit swaying motion thereof.

With the above described arrangement, it will be understood that the body frame is allowed a limited swaying motion in relation to the bridging frame 69.

As said above, "articulation" means a connection through a joint allowing limited universal motion, in known manner.

Although a specific embodiment of this invention has just been described, it will be understood that various modifications are permissible within the spirit of the invention, the scope of which is to be determined from the appended claims only.

I claim:

1. In a wheel suspension for motor vehicles, the combination comprising:
   (a) a front wheel suspension frame;
   (b) a body frame for a vehicle body; said body frame pivotally mounted on said suspension frame above the center of gravity of the body for rocking of said body about a central longitudinal axis thereof;
   (c) a pair of steering knuckle bars, each on one side of said front wheel suspension frame;
   (d) a wheel mounted on each knuckle bar, intermediate the ends thereof for steering movement;
   (e) a transverse reciprocating balancing rod;
   (f) each knuckle bar having one end pivotally mounted on said suspension frame and the other end articulated to said balancing rod whereby reciprocation of said rod causes banking of said knuckle bars and wheels, and (g) leverage balancing means connecting said body frame to said reciprocating balancing rod adapted, upon banking of said vehicle in a curve and swinging of said body away from the center of the curve, to transmit reciprocating motion to said balancing rod to cause banking of said knuckle bars and wheels toward the center of the curve.

2. In a wheel suspension for motor vehicles, the combination comprising:

(a) a front wheel suspension frame;
(b) a body frame for a vehicle body; said body frame pivotally mounted on the suspension frame above the center of gravity of the body for rocking of said body about a central longitudinal axis thereof;
(c) a pair of steering knuckle bars, each on one side of said front wheel suspension frame;
(d) a wheel mounted on each knuckle bar, intermediate the ends thereof for steering movement;
(e) a transverse reciprocating balancing rod;
(f) each knuckle bar having one end pivotally mounted on said suspension frame and the other end articulated to said balancing rod whereby reciprocation of said rod causes banking of said knuckle bars and wheels, and
(g) leverage balancing means connecting said body frame, below the pivot connection of the body frame to the suspension frame, to said reciprocating balancing rod adapted, upon banking of said vehicle in a curve and swinging of said body away from the center of the curve, to transmit reciprocating motion to said balancing rod to cause banking of said knuckle bars and wheels toward the center of the curve.

3. A combination as claimed in claim 2, including leverage steering means connected to said steering knuckle bars adapted, upon actuation, to cause said bars and wheels connected thereto to turn toward the center of the curve.

4. In a wheel suspension for motor vehicles, the combination comprising:

(a) an upright front wheel suspension frame;
(b) a body frame for a vehicle body, said body frame pivotally mounted at the upper end and centrally thereof to the suspension frame above the center of gravity of the body for rocking of the body about a central longitudinal axis thereof;
(c) a pair of upward inwardly inclined steering knuckle bars, one on each side of said suspension frame;
(d) a wheel mounted on each knuckle bar, intermediate the ends thereof for steering movement;
(e) a transverse reciprocating balancing rod;
(f) each knuckle bar having one end pivotally mounted on said suspension frame and the other end articulated to said balancing rod whereby reciprocating of said rod caused banking of said knuckle bars and wheels, and
(g) leverage balancing means connecting said body frame to said reciprocating balancing rod below the pivot connection between the body frame and the suspension frame adapted, upon banking of said vehicle in a curve and swinging of said body away from the center of the curve, to transmit reciprocating motion to said balancing rod to cause banking of said knuckle bars and wheels toward the center of the curve.

5. A combination as claimed in claim 4, wherein said suspension frame is formed of a horizontal lower member and two lateral vertical members; said body frame extending through said suspension frame, between said lateral members and above said lower members, said body frame including an upright structure forwardly of said suspension frame; a pair of connecting elements articulated at one end to a common point at the upper end of said upright structure and articulated, at the other end, to the upper end of one of said lateral members whereby said body frame may rock about a horizontal longitudinal axis thereof, and shock-absorbing units between each of said connecting elements and said body frame.

6. In a wheel suspension for motor vehicles, the combination comprising:

(a) a body frame for a vehicle body;
(b) an upright front wheel suspension frame pivotally mounted at the upper end and centrally thereof to the body frame above the center of gravity of the body for rocking about a central longitudinal axis thereof;
(c) a pair of upward inwardly inclined steering knuckle bars, one on each side of said suspension frame;
(d) a wheel mounted on each knuckle bar, intermediate the ends thereof for steering movement;
(e) a transverse reciprocating balancing rod;
(f) each knuckle bar having one end pivotally mounted on said suspension frame and the other end articulated to said balancing rod whereby reciprocating of said rod caused banking of said knuckle bars and wheels, and
(g) leverage balancing means connecting said body frame to said reciprocating balancing rod below the pivot connection between the body frame and the suspension frame adapted, upon banking of said vehicle in a curve and swinging of said body away from the center of the curve, to transmit reciprocating motion to said balancing rod to cause banking of said knuckle bars and wheels toward the center of the curve;
(h) said leverage balancing means comprising:
an operating lever pivotally mounted, intermediate the ends thereof, to said suspension frame;
a pair of joining elements, one of said elements pivoted at the end thereof, to one end of said lever and to said body frame, and the other joining element pivotally mounted at the ends thereof, to the other end of said lever and to said reciprocating balancing rod.

7. A combination as claimed in claim 6, including leverage steering means connected to said steering knuckle bars adapted, upon actuation, to cause said bars and wheels connected thereto to turn toward the center of the curve.

8. A combination as claimed in claim 6, including a rear wheel suspension comprising:
a U-shaped bridging frame secured to the rear axle of said vehicle, longitudinal thereon and over said body frame;
shock-absorbing units interconnecting said body frame and bridging frame, and
stabilizing means interconnecting said body frame and said rear axle, and said body frame and bridging frame on the rear side of said axle.

References Cited by the Examiner

UNITED STATES PATENTS

| | | | |
|---|---|---|---|
| 2,029,735 | 2/1936 | Minot | 280—112 |
| 2,200,798 | 5/1940 | Megow | 280—112 X |
| 2,279,120 | 4/1942 | Hurley | 280—124 |
| 2,625,232 | 1/1953 | Lado | 180—79.2 |
| 2,652,263 | 9/1953 | Varnum | 280—96.2 X |
| 2,739,658 | 3/1956 | Kolbe | 280—112 X |
| 2,852,268 | 9/1958 | Johnson | 280—112 X |
| 3,137,513 | 6/1964 | Marot | 280—112 |

BENJAMIN HERSH, *Primary Examiner.*

W. A. MARCONTELL, *Assistant Examiner.*